United States Patent [19]

McCarroll

[11] 4,399,586
[45] Aug. 23, 1983

[54] DUAL WHEEL CASTER

[75] Inventor: Raymond A. McCarroll, Grosse Point Woods, Mich.

[73] Assignee: Herder, N.V., Curacao, Netherlands Antilles

[21] Appl. No.: 76,831

[22] Filed: Sep. 19, 1979

Related U.S. Application Data

[63] Continuation-in-part of Ser. No. 15,894, Feb. 28, 1979, abandoned.

[51] Int. Cl.³ ............................................. B60B 33/00
[52] U.S. Cl. ........................................ 16/31 R; 16/47
[58] Field of Search ................ 16/31 R, 31 A, 47, 48, 16/29, 45, 46

[56] References Cited

U.S. PATENT DOCUMENTS

| Re. 16,133 | 8/1925 | Smithfield | 16/29 |
| 324,487 | 8/1885 | Rice | 16/47 |
| 568,025 | 9/1896 | Graessle | 16/31 R |
| 610,309 | 9/1898 | Slater | 16/31 R |
| 2,129,579 | 9/1938 | Herold | 16/31 R |
| 4,024,600 | 5/1977 | Feinberg | 16/31 R |

FOREIGN PATENT DOCUMENTS

| 2513565 | 10/1975 | Fed. Rep. of Germany | 16/47 |
| 2529201 | 2/1976 | Fed. Rep. of Germany | 16/45 |

Primary Examiner—Andrew V. Kundrat
Attorney, Agent, or Firm—McWilliams, Mann, Zummer & Sweeney

[57] ABSTRACT

A dual wheel caster wherein the parts thereof are fabricated from steel, or other sheet metal, including a body frame member made from a metal stamping having an integral socket for a vertical swivel stem and carrying an axle, and a pair of supporting wheel members on respectively opposite sides of the body frame member and a fender with the wheels supported from the body frame member and comprised of a sheet metal stamping and a bottom support member for the fender.

16 Claims, 14 Drawing Figures

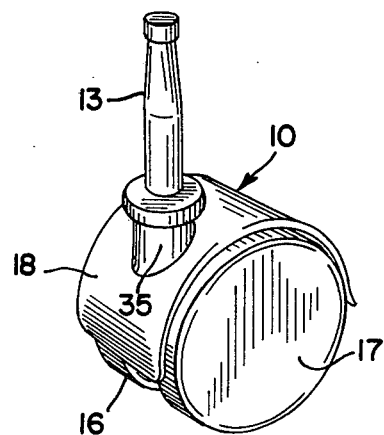
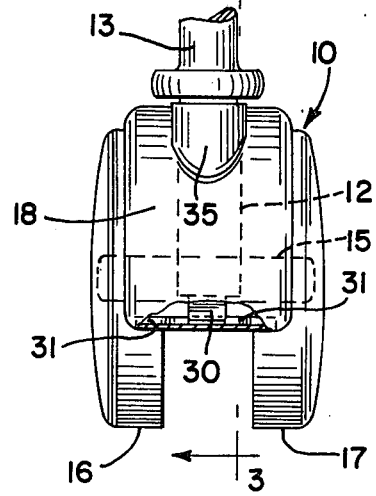
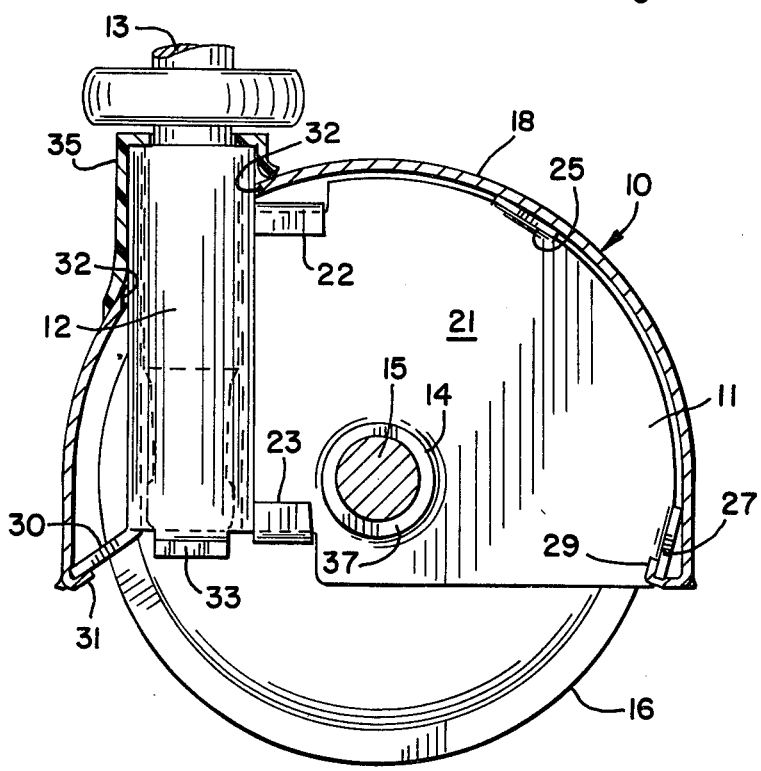

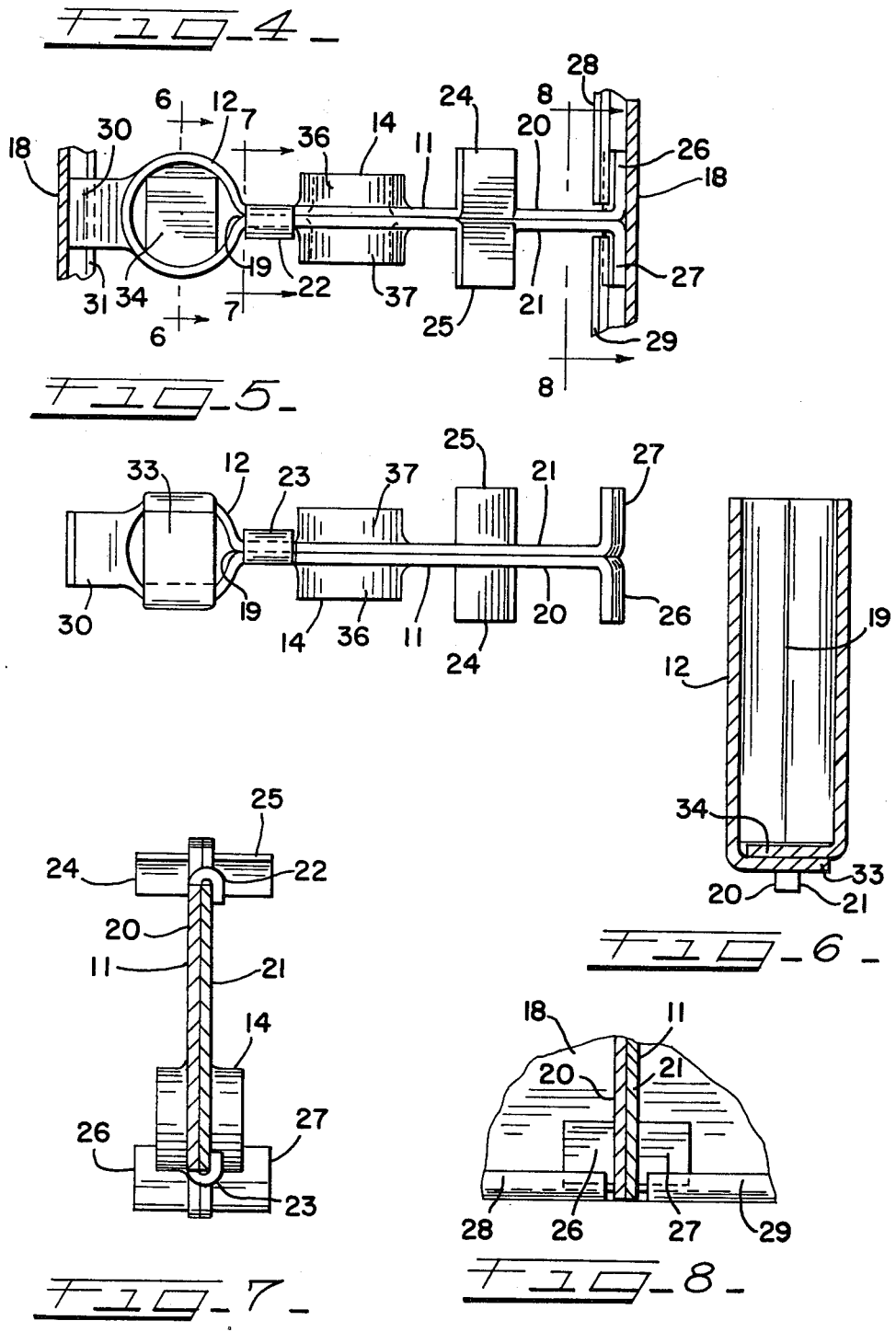

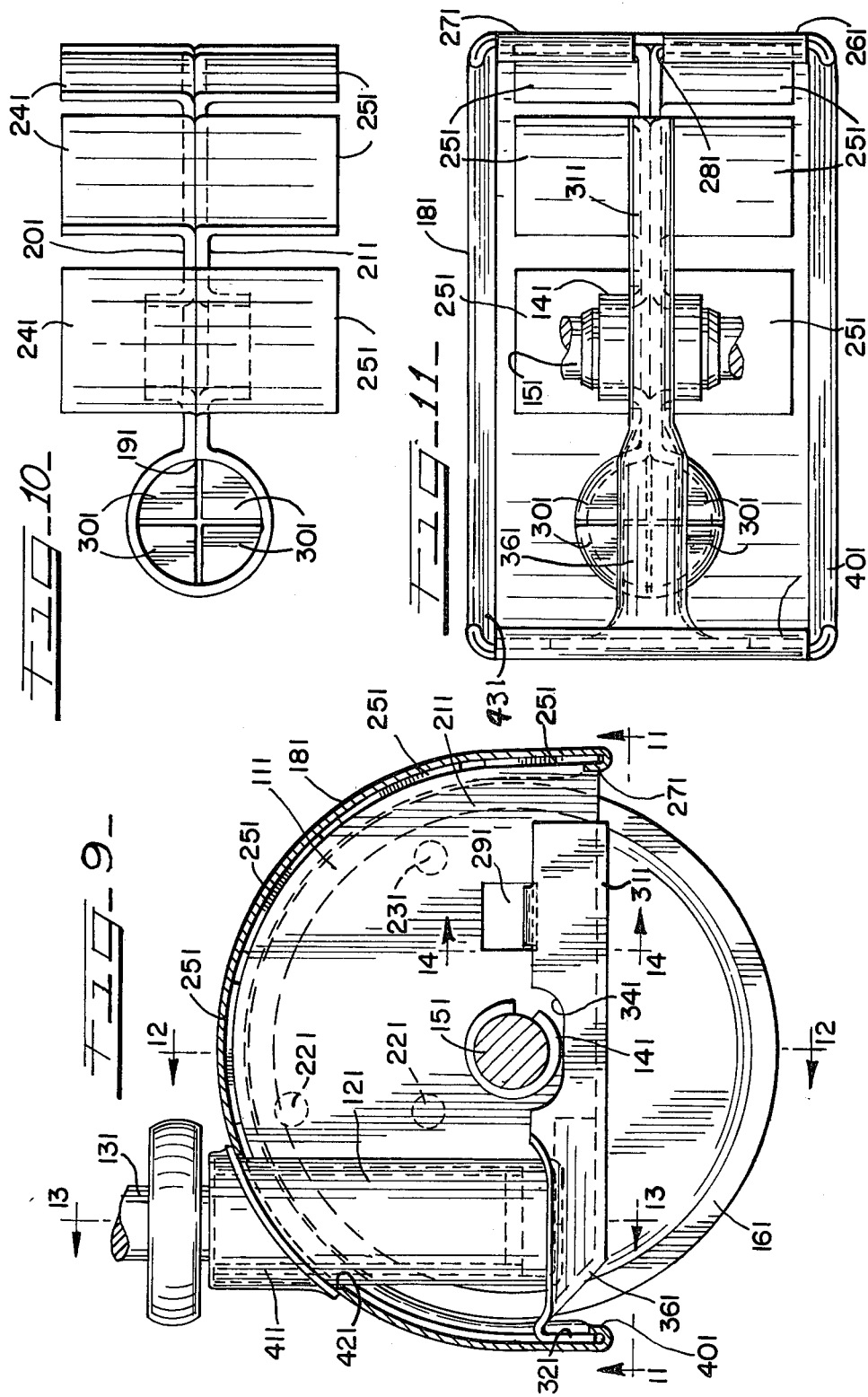

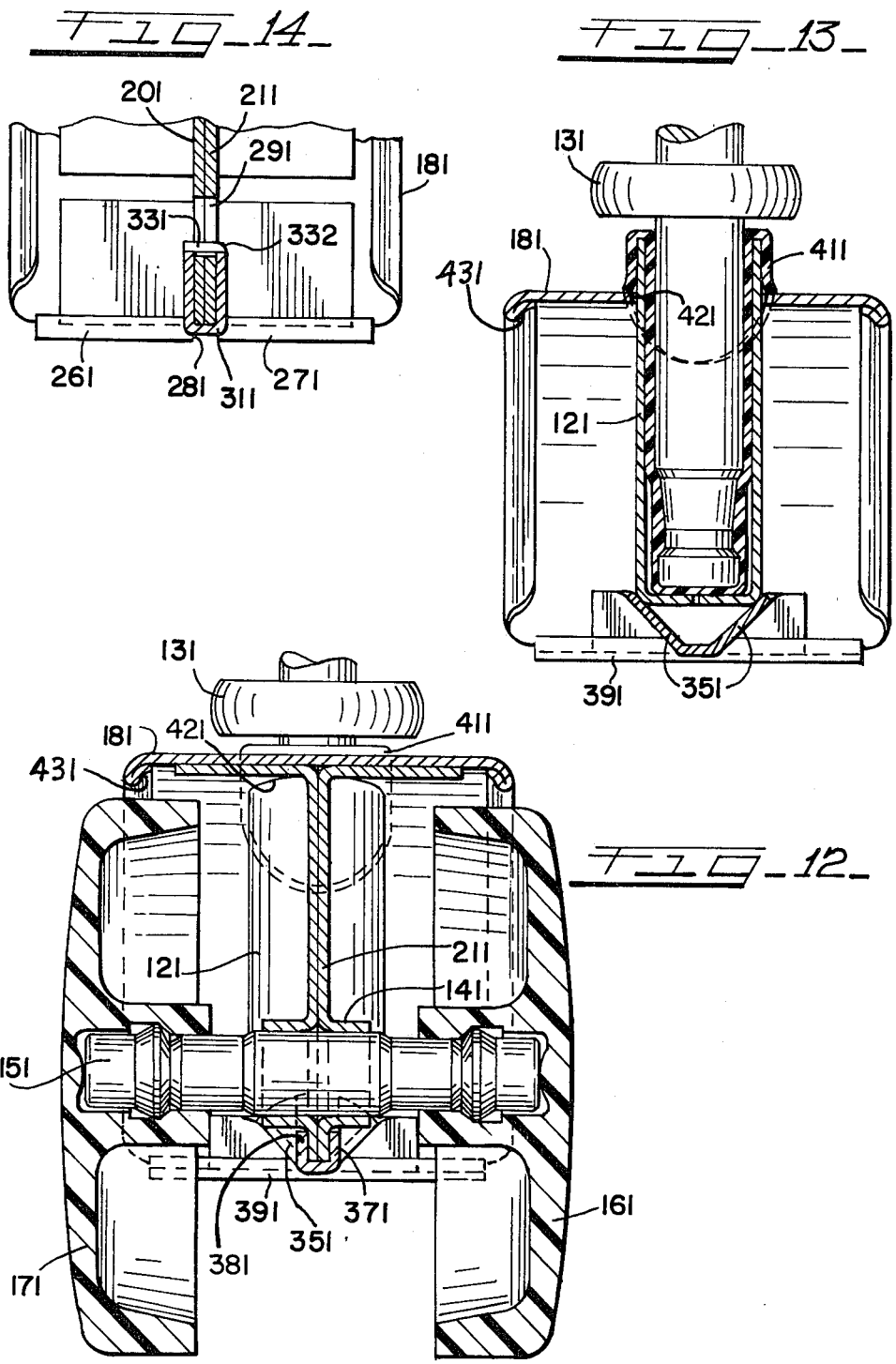

DUAL WHEEL CASTER

This application is a continuation-in-part of Ser. No. 015,894, filed Feb. 28, 1979, abandoned.

BACKGROUND OF THE INVENTION

Heretofore, two wheel casters have been available in the prior art but such casters utilized a die cast zinc body frame and wheel cover of integral construction and while certain casters have been known where the body frame was made from metal stampings, such casters mounted a supporting wheel on an inclined axle and with the body frame inclined at an angle to the vertical swivel stem mounting the caster in an article to be supported by the caster. The exposed body frame, axle and swivel stem socket were enclosed by hesmispherical metal covers secured respectively to the body frame and wheel. Two wheel type casters have not been available heretofore where the body frame and wheel cover were fabricated from metal stampings. Consequently, prior casters of this type were more expensive to manufacture and were heavier for a given load. The amount of material in such casters was burdensome from a cost standpoint, especially with the constantly escalating cost of materials and as a consequence competitive advantages of casters of superior design have been on the verge of being lost to competitive casters and particularly, where U.S. patents expire, from foreign competition where the manufacturers are able, with lower labor costs as well as material costs, to furnish casters of proven design and performance from the disclosure of an expired U.S. patent and thus bring to market a good caster from a fully developed design without incurring any of the development costs ordinarily entailed by such U.S. patentee in producing a caster of competitive quality. Such casters, of course, are sold for less than the price of the domestic product which are developed and produced on the basis of all normal development costs being included in the sales price of the caster. In the face of this competition it has become imperative that the costs be reduced in producing a caster of new and improved design and representing a superior structure fully capable of competing on the basis of price as well as quality.

SUMMARY OF THE INVENTION

This invention provides a caster wherein the manufacturing costs have been reduced by taking both weight and material out of the structure while providing a caster of greater strength capable of efficient and economical manufacture. This has been accomplished particularly by designing a caster structure which utilizes a one piece body frame fabricated from a metal stamping which incorporates a socket for a vertical swivel stem and a journal for an axle mounting a pair of supporting wheels on opposite sides of the body frame. The caster includes a fender secured to the body frame and also made from a light weight metal stamping. The fender is supported and secured at one end by a bottom member secured to the body frame. The important improvements in this caster design are realized from the fabrication of the body frame and fender from light weight metal stampings and mounting of all of the parts including the cover, swivel stem and axle mounted wheels in assembled relation on the body frame.

The parts might be made from other materials, for instance the wheel cover could be made from a suitable plastic material and the wheels, as shown, are both made from a plastic such as Zytel. The metal stampings not only give the caster a desirable aesthetic effect but more importantly provide the necessary strength while effecting a worthwhile reduction in the weight of the material used in the manufacture and whereby the costs of producing the caster are reduced and enable the caster parts to be designed for easy fabrication.

OBJECTS OF THE INVENTION

The primary purpose of this invention is the provision of a two wheel type caster of low cost design, having light weight while affording the required strength properties and which is easily fabricated.

The principal object of the invention is to provide a dual wheel caster having a body frame and a fender fabricated from metal stampings.

An important object of this invention is the provision of a dual wheel caster having a body frame of one piece construction made from a metal stamping.

Another object of the invention is to provide a dual wheel caster having a one piece body frame fabricated from a metal stamping incorporating a vertical swivel stem socket and a journal for a horizontal wheel axle.

A further object of the invention is the provision of a dual wheel caster having a body frame fabricated from a one piece stamping with an integral swivel stem socket, wherein the stamping is folded back upon itself around such socket and forms a multi-ply body plate throughout a major area of the body frame.

A still further and more specific object of the invention is to provide a dual wheel caster having a multiply plate body frame fabricated from a one piece sheet metal stamping folded back upon itself to form such plies and having integral fastening tabs formed to secure the plies together.

Still another object of the invention is the provision of a dual wheel caster having a multi-ply plate body frame and fender each fabricated from a one piece metal stamping wherein the body frame incorporates integral tabs formed to support and secure the wheel cover on the body frame.

Another object of the invention is to provide a dual wheel caster having a multi-ply plate body frame and a fender, each of which is fabricated from a one piece metal stamping and wherein the body frame incorporates an integral supporting flange for the wheel cover about at least a portion of its periphery and a separate cover support member secured to the body frame adjacent the bottom thereof and securing the wheel cover at one end.

DESCRIPTION OF THE DRAWINGS

The foregoing and other and more specific objects of the invention are attained by the caster structure and arrangement illustrated in the accompanying drawings wherein FIG. 1 is a general perspective of a dual wheel caster constructed in accordance with the teachings of this invention;

FIG. 2 is a front elevational view of the caster;

FIG. 3 is a vertical sectional view through the caster assembly taken on the line 3—3 of FIG. 2;

FIG. 4 is an elevational plan view of the caster body frame with the wheel cover indicated as being attached at opposite extremities of the frame;

FIG. 5 is an upward view from the bottom of the body frame structure;

FIG. 6 is a vertical sectional view through the swivel stem socket of the body frame, taken on the line 6—6 of FIG. 4;

FIG. 7 also is a vertical sectional view through the body frame taken on the line 7—7 of FIG. 4 showing the bent tabs top and bottom securing the two plies of the body frame plates together;

FIG. 8 is a detail fragmentary view with a portion of the body frame plates in section, taken on the line 8—8 of FIG. 4, showing one of the attachments of the wheel cover to the body frame;

FIG. 9 illustrates a modification and shows the body frame member in side elevation with the fender being shown in section with a bottom support member secured on the body frame and secured to the wheel cover at one end thereof;

FIG. 10 is a plan view of the modified caster body frame in plan elevation with the fender indicated in section and with the bottom support member shown secured to the cover at one end thereof;

FIG. 11 is a bottom plan view looking upwardly from the bottom of the body frame structure;

FIG. 12 is a vertical sectional view taken on the line 12—12 of FIG. 9;

FIG. 13 is a vertical sectional view through the swivel stem socket taken on the line 13—13 of FIG. 9; and FIG. 14 is a detail view in cross section taken on line 14—14 of FIG. 9 showing the flange on the bottom support member extending through an opening in the body frame to secure one end of the support.

DESCRIPTION OF FIRST EMBODIMENT

In the drawings a caster assembly 10 is disclosed as being comprised of a body frame 11, having a socket 12 for a swivel stem 13, a journal 14 for an axle 15, carrying a pair supporting wheels 16 and 17 and a fender 18. The socket 12 and the journal 14 are formed integrally with the body frame 11 and the axle 15 extends through the journal with the wheels 16 and 17 mounted on opposite ends of the axle so that the wheels are disposed upon respectively opposite sides of the body frame. The journal 14 has a horizontal axis whereas the axis of the swivel stem socket 12 extends vertically whereby the stem extending upwardly from the socket, as best indicated in FIG. 1, is adapted to enter the usual mounting socket in an article to be supported by the caster.

The supporting wheels 16 and 17 are made from a suitable plastic material such as Zytel and are mounted by pressing them directly onto the axle 15, with the body frame and vertical socket 12, including the swivel stem 13, disposed between the wheels. The wheels each rotate freely on the axle so that, in the arrangement described, as the caster swivels about stem mounting 13, the wheels may rotate respectively in either direction to accommodate the movements of the caster in its various motions without involving any resistance from the wheels resulting from skidding over a supporting surface, as might be the case if a fixed mounting of the wheels on the axle were used.

The body frame 11 is formed from a metal plate of the desired weight, or thickness, that starts out in the flat and is bent back upon itself by forming the plate around a suitable mandrel to obtain the required diameter of the vertical swivel stem socket 12. This forming operation takes place at the approximate middle of the flat plate so that in the finished article the vertical socket 12 is located at one side of the body frame 11, as best illustrated in FIG. 3. This side of the frame will be referred to as the front side, or leading edge, inasmuch as the swivelling of the caster occurs about the axis of this socket. At the rear side of the socket the formed plate is brought together in face-to-face relationship, as best revealed in FIGS. 4 and 5, and this results in a vertical groove, or recess 19, being formed at the juncture where the two portions of the plate are brought together to close the socket. The opposed plate portions are disposed in face-to-face relationship throughout the major area of the body frame, as best shown in FIGS. 4, 5 and 7 and further indicated in FIG. 3 and results in a two ply structure comprised of plate portions 20 and 21.

The plate portions 20 and 21 may be secured together at the upper and lower edges thereof by means of integral tabs 22 and 23 which, as shown, are formed as a part of the plate portion 20 and bent over the top and bottom juxtaposed edges of the plate portion 21, so that the plate portions are securely maintained in face-to-face engagement. However, the fastenings 22 and 23 may be supplemented in other areas of the confronting plate portions by means of spot welds, if desired, or the tabs might be disposed with entirely and complete reliance placed on such welds distributed in appropriately spaced relation over the general area of the plate portions. Other forms of welding might be utilized, such as arc welding, if desired, to secure the plate portions together around their edges, but the fastening tabs 22 and 23 represent a readily applied means of securing the plate portions together and an economical type of fastening in a production type manufacturing operation.

The plate portions 20 and 21 are provided with means for supporting and securing the fender 18 in place in proper relation to the wheels 16 and 17 and to the body frame. An integral bracket 24 on the plate portion 20 is turned outwardly from the plate at the approximate uppermost portion of the plate under the fender 18 and a similar bracket 25 integral with the plate portion 21 is turned outwardly from the plate in opposite relation to the bracket 24 so that the two brackets are disposed in the same position on the respective plates to extend in opposite directions under the fender and provide a relatively wide bracing support under the fender at an upper position where the support is disposed most effectively to brace the fender in relation to the frame and relative to the wheels and prevent possible contact with the wheels.

The fender 18 is secured to the body frame 11 at opposite locations adjacent the front and rear edges thereof respectively. At the rear edge of the body frame oppositely extending brackets 26 and 27 are formed integrally with the respective plate portions 20 and 21 and are disposed behind rebent flanges 28 and 29 formed integrally with the fender 18 at the bottom of the fender, to form a secure interlocking relationship between the body frame and the fender. The flanges 28 and 29 are spaced apart upon opposite sides of the multi-ply body plate portions 20 and 21, as best shown in FIG. 8.

At the leading edge of the body frame 11 a bracket flange 30, integral with the socket structure 12, is inclined downwardly and forwardly at an angle such as to engage over and behind a rebent flange 31 formed on the front side of the fender 18 and extending rearwardly and upwardly behind the flange 30 at the same angle so as to provide a secure engagement between the fender and body frame to hold the fender in proper relationship to the body frame and caster wheels at the leading edge of the caster.

The interengagement between the flange 30 on the body frame and the flange 31 on the fender at the front of the caster and the interengagement between the brackets 26 and 27 on the body frame at the rear of the caster and the fender flanges 28 and 29, are fully adequate to maintain the fender 18 in operative relationship to the body frame and wheels but, if desired, these connections might be tack welded if a more positive connection should be requested by a purchaser.

At this front side of the caster the socket structure 12 extends upwardly through an opening 32 in the fender so that the socket structure extends above the fender where it is engaged by the swivel stem 13. The bottom end of the socket 12 is closed by inwardly turned flanges 33 and 34 formed integrally with the socket at the bottom thereof. The swivel stem 13 is not mounted directly in the socket but is entered into a bushing formed of a plastic material including a shroud portion 35 overlying and extending around the projecting portion of the socket 12 above the fender fender 18. This bushing arrangement forms the subject matter of copending application Ser. No. 7480, filed Jan. 29, 1979.

The axle journal 14 is formed integrally with the body frame 11 and is comprised of annular flanges 36 and 37 formed on the respective body plate portions 20 and 21 and which extend outwardly from the plate portions, as best shown in FIGS. 4 and 5, to provide internal bearing areas of substantial extent to rigidly support the axle 15 in the body frame 11 and in a properly perpendicular relationship.

The caster body structure thus consists of two elements including a one piece body frame and a separately formed fender, both formed from metal stampings fabricated from sheet metal blanks, wherein the body frame incorporates an integral socket structure extending upwardly through the fender for mounting a swivel stem for the caster and wherein the fender is supported on and secured in operative relationship with the body frame by supporting means on the body frame and cooperating means on the body frame and fender to maintain the two elements properly related and with respect to a pair of wheels mounted upon opposite sides of the body frame on an axle extending through the body frame and finding bearing support therein.

The fender 18 has been shown as comprised of a full width fender member overlying both of the wheels 16 and 17 but this fender can be made of narrower width such as might be mounted more or less coincident with the perimeters of the wheels, or disposed therebetween and while the fender has been disclosed as being of single ply construction for the greatest weight reduction, it could be made of multi-ply construction, particularly in a fender of less than full width over the wheels.

DESCRIPTION OF PREFERRED EMBODIMENT

A preferred form of the caster structure is shown in FIGS. 9 through 14, wherein it will be seen that the body frame continues to be of one piece fabricated construction, formed from a metal stamping, but incorporating a separate bottom support member also formed from a steel stamping. This structure, as shown, provides a rigid caster structure and affords more extensive support for the fender, which is secured at one end to the bottom support member that is mounted on the body frame adjacent the bottom of the frame and extending under the axle and under the swivel stem socket.

As in the first embodiment of the invention, the caster arrangement illustrated in FIG. 9 et seq comprises an assembly 101 which, as herein disclosed, includes the body frame 111 having an integral vertical socket 121 for a swivel stem 131, a journal 141 for an axle 151, carrying a pair of supporting caster wheels 161 and 171, mounted on opposite ends of the axle 151 and a wheel cover, or fender 181. The swivel socket 121 and the journal 141 are formed integrally with the body frame 111 just as in the first embodiment of the invention and the axle 151 extends through the journal 141, where it is mounted by means of a press fit, with the wheels 161 and 171 mounted upon opposite ends of the axle, whereby the wheels are disposed upon respectively opposite sides of the body frame 111. The journal 141 has a horizontal axis so that the axis of the axle 151 also extends horizontally whereas the axis of the swivel stem 131 extends vertically so that the stem extends upwardly from the socket 121 and whereby the stem is readily adaptable to entry into the usual mounting socket provided in an article to be supported by the caster, such as a piece of furniture.

Just as in the first embodiment, the supporting wheels 161 and 171 are made from a suitable plastic material, such as Zytel and are mounted by pressing them directly onto the axle 151, with the body frame 111 and vertical swivel socket 121, including the stem 131, disposed between the wheels. The wheels 161 and 171 rotate freely on the axle 151 so that, as the caster swivels about the stem 131, each of the wheels may rotate in either direction to accommodate movements of the caster about the vertical operative axis without incurring any resistance from either of the wheels which otherwise might result from skidding over a supporting surface. Such skidding might result in an arrangement involving fixed mounting of a pair of wheels on a rotatable axle.

In this form of the invention the body frame 111 also is made from a metal plate that starts out in the flat and being of suitable weight, or thickness, is bent back upon itself by forming the plate around a mandrel of the desired size to obtain the required internal diameter of the vertical swivel stem socket 121. The bending operation about the mandrel occurs at approximately the middle of the flat plate so that in the finished article the vertical socket 121 is located at one side of the body frame 111 similarly to the arrangement and relationship of the body frame and socket structure illustrated in FIG. 3. The swivel socket side of the body frame comprises the front side, or leading edge, inasmuch as swivelling of the caster occurs about the vertical axis of the socket 121. At the rear side of the swivel socket the formed plate comprising ply portions 201 and 211, are brought together in face-to-face abutting relationship, as best shown in FIG. 12 and are spot welded together, as at 221 and 231. The opposed plate portions 201 and 211 are disposed in face-to-face relationship throughout the major area of the body frame 111, as best indicated in FIG. 9 and comprise a two ply structure consisting of the plate portions 201 and 211 which are maintained securely in such face-to-face engagement by the spot welds 221 and 231. It will be seen that because of this multi-ply construction the journal 141 extends from opposite sides of the body frame 111 with each of the plate portions 201 and 211 having a journal bearing projecting laterally therefrom to provide in effect, a pair of oppositely extending journals on a single axis and through which the axle 151 extends to provide for the mounting of the wheels 161 and 171 on respectively opposite sides of the body frame. The forming of the plate, comprising the body frame 111, about the mandrel to obtain the swivel socket 121, results in a vertical groove, or recess 191, at the juncture where the two plate portions 201 and 211 are brought together to complete the socket.

The body frame plate portions 201 and 211 are provided with means to support the fender 181, on the body frame in proper relation to the wheels 161 and 171. A series of flanges 241 and 251, integral with the respective plate portions 201 and 211, are formed to extend outwardly in respectively opposite directions from the plate portions so that the flanges afford extended areas of support for the fender 181 disposed substantially about the major upper perimeter portion of the body frame 111 with the several flanges disposed oppositely under the wheel fender to provide a relatively wide bracing support under the fender throughout a major portion of the fender and effectively brace the fender relative to the frame and the wheels 161 and 171 and thereby prevent any possibility of contact with the wheels.

The fender 181 is secured to the body frame 111 at opposite locations adjacent the front and rear edges of such frame. At the rear edge the fender is provided with a pair of depending flanges 261 and 271 at opposite sides of a central notch 281 and the depending flanges are adapted to be rebent under the outstanding flanges 241 and 251 at opposite sides of the centrally disposed body frame 111 to provide an interlocking relationship between the fender 181 and the outstanding flanges on the body frame and thus secure the fender to the body frame at this point. The rebent flanges 261 and 271 in their secured positions are disposed upon opposite sides of the body frame 111 and behind the respective outstanding flanges 241 and 251.

At the leading edge of the body frame 111 the swivel socket 121 is provided with a generally flat substantially closed bottom formed by segmental, generally triangular sections 301 integral with the socket structure and turned inwardly from the bottom perimeter of the socket walls to form a bottom wall for the socket. The triangular bottom wall sections 301 are generally pie-shaped and are designed to have their points meet approximately at the center of the socket and to have their opposite side edges disposed in proximity to the respectively adjacent edges of next related pie-sections so that the bottom of the swivel socket to all intents and purposes, is substantially closed and flat.

Spaced rearwardly of the swivel socket 121, generally midway between the rear edge of the body frame 111, as defined by the outstanding flanges 241 and 251, and the axle location 215, the body frame is provided with a rectangular opening 291 extending entirely through both plies of metal plate represented by the body plate portions 201 and 211.

A bottom mounted fender support member 311 is mounted on the body frame member 111 and extends along a major portion of the length of the body frame member under the opening 291, under the axle 151 and journal 141, under the swivel socket 121 and extending beyond the socket to a point where it terminates in a depending flange 321. The bottom support member 311 is U-shaped, as will be seen from FIG. 12 and the two vertical legs 371 and 381 of the U extend upwardly upon opposite sides of the body frame structure 111, so that the body frame, as represented by the confronting plate portions 201 and 211, is disposed between these upstanding flanges. The U-section extends rearwardly beyond the opening 291, but at this opening the member 311 is provided with an upstanding flange 331 that is adapted to be formed with a reflange 332 to extend through the body frame opening and thus secure the bottom member on the body frame at this point.

Both upward flanges of the U-shaped fender support member are cut out at the location of the axle 151, as at 341, to provide clearance for the journals 141, which project outwardly in opposite directions from the respective body frame plate portions 201 and 211, with which the journals are integrally formed. At the location of the swivel socket 121, the upstanding flanges 371 and 381 of the U-section bottom member are flared outwardly, as best shown in FIG. 13 at 351, which has the effect of lowering the height of the fender support member beneath the swivel socket structure. At the forward side of the socket 121 the support member 311 slopes upwardly, as at 361 and then is bent over at the end of the member and terminates in the downwardly directed flange 321.

The fender 181 is secured in front of the leading edge to the body frame member through the medium of the bottom mounted fender support member 311 and as best shown in FIG. 9, the leading edge bottom flange 391 on the fender, is rebent under and behind the depending flange 321 on the support member 311, as at 401, thus to securely fasten the fender at this point and provide a secure engagement between the fender 181 and the body frame 111 to hold the fender in proper relationship to the body frame and the caster wheels 161 and 171.

Adjacent to the leading edge of the caster the swivel socket structure 121 extends upwardly through an opening 421 in the fender whereby the socket extends above the top surface of the fender where it is operatively engaged by the swivel stem 131. The bottom end of the socket 121 is fully closed, as hereinbefore described, by the integrally formed internal triangular bottom wall sections 301. As described in reference to the FIG. 3 form of the invention, the swivel stem 131 is mounted in a plastic bushing 411. This bushing fits within the socket 121, fully lining the socket and extending upwardly over the top end of the upstanding socket and overlies and surrounds the portion of the socket above the fender opening 421, so that the socket is fully enclosed thereby, as disclosed and covered in application Ser. No. 7480, filed Jan. 29, 1979.

The opposite side edges of the fender 181 are stiffened and reinforced by bending the metal of the fender along such edges back upon itself, as best indicated in FIG. 12 at 431 and then forming the reinforced edge structure on an arc at each side whereby to provide smoothly rounded side edges free of sharp edges and presenting curved side edges overlying the wheels 161 and 171 substantially throughout the extent of the fender.

The axle 151 is rigidly fixed in the journals 141 by means of a press fit and extends in opposite directions outwardly from the respective body plate portions 201 and 211. The journals 141 thus afford bearing areas of substantial extent engaging the axle to rigidly mount the axle in the body frame 111 in a properly perpendicular relationship. As before, the caster consists of two elements comprising the one piece body frame member 111 and the separately formed fender 181, both fabricated in the form of metal stampings from sheet metal blanks and with the body frame incorporating the integral socket structure 121 adjacent to the leading edge of the caster assembly that extends vertically through the fender for receiving the swivel stem 131 to mount the caster relative to an article of furniture, or the like. The body frame and fender are retained in properly operative relationship by cooperating means on both whereby the two elements are maintained in proper positions relative to the wheels 161 and 171 mounted respectively on opposite sides of the body frame 111 on the axle 151.

From the foregoing it will be seen that a dual wheel caster has been provided of lighter weight, increased strength and more economical manufacture, where the parts are made from sheet metal stampings including a one piece body frame of multi-ply construction incorporating an integral swivel stem socket and integral bearings for an axle carrying supporting wheels on opposite sides of the body frame, with a separate fender secured to the body frame at one end and secured at the other end to a bottom support member mounted on the body frame to maintain proper relationship with the wheels.

What is claimed is:

1. A caster body assembly comprised of a body frame member of one piece integral construction and a separate fender member, said body frame member being of multi-ply construction shaped to conform to and support the fender member and having an axle bearing formed therein, a vertical swivel stem socket disposed adjacent the leading edge of the body frame formed integral with the plies of said body frame member at one side of the body frame member and extending upwardly through the fender member, said fender member and frame member having cooperating means securing the fender to the body frame member adjacent said one side including a pair of oppositely extending brackets integral respectively with the body frame member plies, a flange on the fender engaged with said brackets on opposite sides of the body frame member, cooperating means at the other side of the body frame securing the fender thereto, and a pair of supporting wheels disposed respectively upon opposite sides of said body frame member mounted on an axle extending horizontally through said bearing.

2. A caster body assembly as set forth in claim 1 wherein said fender is of single ply construction and extends in overlying relation to both of said wheels.

3. A caster body assembly as set forth in claim 1 wherein said swivel stem socket is of single ply construction.

4. A caster body assembly as set forth in claim 3 wherein said socket has integrally formed flanges underlying the bottom of the socket, and bent tabs integral with one of said body frame member plies overlying the opposing ply to secure the plies together.

5. A caster body assembly as set forth in claim 1 wherein at least one support bracket integral with said body frame is disposed under said fender adjacent to a top edge of the body frame member.

6. A caster body assembly as set forth in claim 5 wherein said support bracket includes oppositely extending members integral respectively with each of said plies of the body frame members.

7. A caster body assembly as set forth in claim 1 wherein said body frame member plies are secured together.

8. A caster body assembly as set forth in claim 1 wherein said body frame member and said fender member are fabricated from metal stampings formed from sheet metal.

9. A caster body assembly as set forth in claim 1 wherein said socket has integrally formed triangular wall sections underlying the bottom of the socket, said sections substantially closing the socket bottom.

10. A caster body assembly comprised of a body frame member of one piece integral construction and a separate fender member, said body frame member being of multi-ply construction shaped to conform to and support the fender member and having an axle bearing formed therein, a vertical swivel stem socket disposed adjacent the leading edge of the body frame formed integral with the plies of said body frame member at one side of the body frame member and extending upwardly through the fender member, said fender member and frame member having cooperating means securing the fender to the body frame member adjacent said one side including an inclined bracket flange extending downwardly and forwardly from said socket, cooperating means at the other side of the body frame securing the fender thereto including a similarly inclined flange adjacent the bottom of the fender disposed adjacent to and secured with respect to said bracket flange, and a pair of supporting wheels disposed respectively upon opposite sides of said body frame member mounted on an axle extending horizontally through said bearing.

11. A caster body assembly comprised of a body frame member and a separate fender member, said body frame member being of multi-ply construction shaped to conform to and support the fender member and having an axle bearing formed therein, a vertical swivel stem socket formed integral with the plies of said body frame member at one side of the body frame member and extending upwardly through the fender member, said fender member and frame member having cooperating means securing the fender to the body frame member adjacent said one side including a bottom support member secured to the body frame member and projecting beyond said swivel stem socket and said fender member is secured to the projecting portion of the support member, cooperating means at the other side of the body frame securing the fender thereto, and a pair of supporting wheels disposed upon opposite sides of said body frame member mounted on an axle extending horizontally through said bearing.

12. A caster body assembly as set forth in claim 11 wherein said bottom support member is of U-section embracing both of said body frame member plies, said support member extending under said axle and under said swivel stem socket, an opening through said body frame member, and a flange on the bottom support member extending through said opening.

13. A caster body assembly as in claim 12 wherein said bottom support member terminates in a depending flange at one end, and said fender is secured to said depending flange.

14. A caster body assembly as in claim 13 wherein said U-section member is of flared section beneath said swivel stem socket and the U-section is provided with a cut out beneath said axle.

15. A caster body assembly as in claim 13 wherein said opening through the body frame member and said flange on the support member are located adjacent to one end of the bottom support member, and said depending flange is located at the opposite end of the support member adjacent to the leading edge of the caster.

16. A caster body assembly comprised of a body frame member and a separate fender member, said fender member being of single ply construction having rebent side edges providing multi-ply edge structures formed on a downward curve, said body frame member being of multi-ply construction shaped to conform to and support the fender member and having an axle bearing formed therein, a vertical swivel stem socket formed integral with the plies of said body frame member at one side of the body frame member and extending upwardly through the fender member, said fender member and frame member having cooperating means securing the fender to the body frame member adjacent said one side and cooperating means at the other side of the body frame securing the fender thereto, and a pair of supporting wheels disposed respectively upon opposite sides of said body frame mounted on an axle extending horizontally through said bearing.

* * * * *